United States Patent [19]
Jones, Jr. et al.

[11] 3,758,572
[45] Sept. 11, 1973

[54] PROCESS FOR RECOVERING UREA FROM PYROLYSIS SYSTEMS

[75] Inventors: Irby C. Jones, Jr.; Aubrey J. Rhymes, Jr., both of Lake Jackson, Tex.

[73] Assignee: The Dow Chemical Company, Midland, Mich.

[22] Filed: Apr. 26, 1971

[21] Appl. No.: 137,208

[52] U.S. Cl. ............ 260/553 B, 23/193, 260/248 A
[51] Int. Cl. ........................................... C07c 127/24
[58] Field of Search .................... 260/553 B, 248 A, 260/249.7 A; 23/193

[56] References Cited
UNITED STATES PATENTS
2,370,065  2/1945  Olin ................................. 260/553 B
2,943,088  6/1960  Westfall .......................... 260/248 A Primary Examiner—Leon Zitver
Assistant Examiner—Michael W. Glynn
Attorney—Griswold & Burdick, Gary D. Street and Kenneth Bjork

[57] ABSTRACT

In a process of pyrolyzing urea in a reactor system through which a stream of inert gas is passed to accelerate the rate of pyrolysis by purging evolved ammonia therefrom, an improved method for recovering unreacted vaporized urea also purged by the gas stream with the ammonia which comprises passing the condensable vapors of an inert compound through the reactor (s), cooling the purged ammonia and urea containing vapor mixture to a temperature low enough to condense the vapors of the inert compound thereby minimizing the concentration of this component in the vapor mixture, but high enough to preclude urea condensation, feeding the resulting concentrated vapor mixture to a gas/liquid contacting column and contacting the same with fresh urea melt feedstock, thereby condensing a substantial amount of the urea vapor contacted, feeding the condensed urea along with the urea melt feedstock to the pyrolysis reactor(s), and passing the urea depleted effluent vapor mixture to a conventional ammonia recovery unit.

4 Claims, 1 Drawing Figure

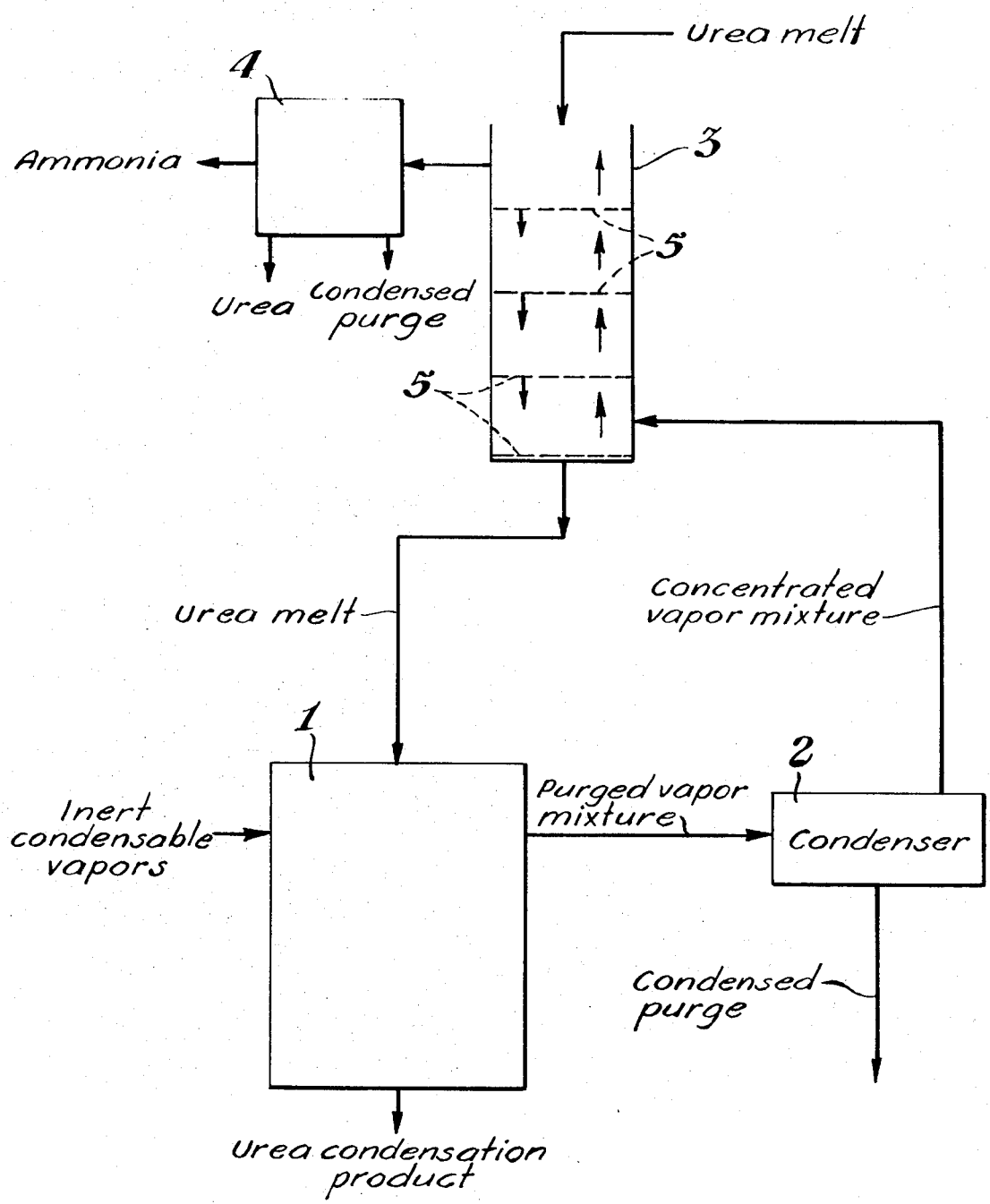

PROCESS FOR RECOVERING UREA FROM PYROLYSIS SYSTEMS

BACKGROUND OF THE INVENTION

Pyrolyzing urea in one or more reactors at temperatures between 115°C. and 350°C., depending upon the reaction conditions employed, provides varying and controlled amounts of autocondensation products of urea such as biuret, triuret and cyanuric acid. In such urea pyrolysis processes, inert gases, such as, for example, air, nitrogen and the like, are usually employed to purge evolved ammonia by-products from the pyrolysis reactor, thus enabling an increase in the pyrolysis reaction rate. In such processes, the usual practice is to separate the purge gas from the ammonia, recycle the same to the reactor, and recover the ammonia in a conventional manner. However, in such pyrolysis operations it commonly is found that some of the urea reactant, for example as much as from about 5 to about 15 percent or more of the total urea fed into the reactor, is vaporized therein and is lost from the reactor in the gas purge without undergoing pyrolysis to the desired autocondensation product or products.

In subsequent separation of this purge gas from the ammonia and recovery of the ammonia in conventional methods, the urea is lost to the ammonia recovery medium and cannot readily be recovered for recycle to the pyrolysis reaction. Since the urea raw material cost ranges from about 40 to about 60 per ton, a loss of from about 5 to about 15 percent of the total amount fed becomes economically prohibitive; it is thus a necessity that the urea values as well as the ammonia by-product be recovered for reuse.

Known methods employed heretofore for recovering such vaporized urea involve cooling of the urea and ammonia containing purge gas mixture as it emerges from the reactor(s) to cause condensation of the urea vapor, and then filtering the same to recover the urea. In such prior art methods, the additional expense involved in cooling and filtration systems to achieve condensation of urea and the separation from the residual ammonia and purge gas, and the thermal requirements for reheating the urea for reuse, can more than offset the value of the urea recovery.

In related urea pyrolysis reactions, (See Canadian Pat. No. 852,222), it is known that the cyanuric acid vapor phase of an ammonia/cyanic acid vapor mixture carried off from urea pyrolysis reactors with the ammonia liberated therein, can be condensed by contact with fresh urea melt being fed to the reactor(s) to form biuret therewith. Such method, however, does not solve the basic problem of separating the urea from the other components of the vapor mixture driven off from the urea pyrolysis reactor(s) without necessitating economically prohibitive measures as previously set forth for recovering the urea.

It is therefore apparent that an improved method is needed for the separation of the various phases of the vapor mixture driven off from the urea pyrolysis reactor(s) so that the urea remains in the vapor state for subsequent recovery in an economical and efficient manner.

In attempting, however, to separate the purge gas phase from the vapor mixture driven off from the urea pyrolysis reactor(s) by cooling the vapor mixture to a temperature low enough to condense the purge gas phase, but high enough to maintain the urea and ammonia in the vapor state, many difficulties have been encountered. Urea, which has a melting point of about 132°C., is thought to sublime at temperatures from about 120°C. to the melting point, and is furthermore thought to undergo, to some extent, rearrangement in the presence of ammonia to form ammonium cyanate, a highly volatile substance having a sublimation point of about 60°C. Thus, under the temperature and pressure conditions necessary to condense many of the commonly employed purge gases, such as, for example, air, nitrogen, and the like, the urea vapor (or the rearrangement product, ammonium cyanate, which is also thought to undergo inverse transformation on cooling to form urea), will also be condensed, thereby requiring economically prohibitive measures such as previously mentioned to recover the condensed urea.

In accordance with the present invention, a novel process for separating an inert purge gas from the urea vapor while maintaining the urea in the vapor state for subsequent recovery has been discovered. In the practice of the present invention, by employing vapors of inert hydrocarbon compounds which are condensable at temperatures above the point where the sublimed urea vapor condenses back to the solid state, i.e., above about 120°C., to purge urea pyrolysis reactors, the purged vapor mixture can subsequently be cooled to a temperature low enough to condense a substantial portion of the hydrocarbon vapor without also condensing the urea vapor. The resulting residual vapor mixture, having a greatly increased mole fraction concentration relative to urea, can subsequently be contacted with fresh urea melt feedstock having a vapor phase concentration at or near a minimum, thereby enabling a substantial portion of the urea vapor contacted to be condensed and recycled to the urea pyrolysis reactor(s).

A principal object of this invention is to provide in a process for the pyrolysis of urea in the presence of an inert purge gas an improved method for the recovery of unreacted vaporized urea and its recycle to the urea pyrolysis reactor for reuse.

Other objects and aspects, as well as the several advantages of the invention will become apparent upon consideration of the accompanying disclosure, the drawing, and the appended claims.

SUMMARY OF THE INVENTION

We have discovered, and this constitutes our invention, an improved method for recovering and recycling unreacted vaporized urea purged from one or more urea pyrolysis reactors, the improvement conprising purging urea pyrolysis reactors with the vapors of an inert compound, said vapors being condensable at temperatures high enough to preclude condensation of the urea vapor, cooling the purged ammonia and urea containing vapor mixture in a condensor to a temperature low enough to condense a substantial amount of the inert purge vapor, but high enough to preclude urea condensation, and contacting the resulting concentrated vapor mixture with fresh urea melt feedstock being fed to the urea pyrolysis reactor(s), thereby condensing a substantial amount of the urea vapor contacted for recycle to the reactor(s).

More particularly, we have discovered a particular process which during operation allows for the efficient recovery of and recycle of unreacted vaporized urea purged from urea pyrolysis reactors. Most specifically, we have discovered that by purging urea pyrolysis reactors with the vapors of inert hydrocarbon compounds which are condensable at temperatures above about 120°C., the hydrocarbon/ammonia/urea vapor mixture driven off from the reactor(s) can be cooled in a condensor to a temperature low enough to condense a substantial amount of the hydrocarbon vapor without also condensing the urea vapor.

Further, in accordance with the invention, we have discovered that by contacting the residual vapor mixture obtained upon condensation of the hydrocarbon vapor with fresh urea melt feedstock in a gas/liquid contactor, said residual vapor mixture having greatly increased mole fraction concentrations relative to ammonia and urea as a result of the hydrocarbon vapor condensation and said urea melt being at a temperature near its fusion point and thus having an equilibrium vapor phase concentration at or near a minimum, a substantial amount of the urea vapor contacted can be condensed and recycled.

DESCRIPTION OF THE PREFERRED EMBODIMENTS

In a preferred embodiment, there is employed as inert purge gas the condensable vapors of saturated branched-and straight- chain hydrocarbon compounds of the alkane series having from about eight to about 12 carbon atoms, or mixtures thereof. Further, in accordance with the preferred embodiment, the hydrocarbon vapors are employed at temperatures near the temperature of the urea pyrolysis reaction being conducted and are furthermore condensable at temperatures above about 120°C. In a further preferred embodiment of the present invention, a mixture of the vapors of eight and nine carbon atom isoparaffinic hydrocarbons, said vapor mixture being condensable at about 125°C., is employed to purge the urea pyrolysis reactor(s).

Other compounds can be employed provided (a) the compounds have an observed boiling point near the urea pyrolysis reaction temperature and pressure conditions employed, (b) the vapors of such compounds are substantially inert to urea and its autocondensation products as well as to ammonia evolved during the process and (c) the vapors are readily condensable at temperatures above about 120°C., the temperature below which urea vapor will wholly or partially condense.

In carrying out the method of the present invention, the maximum amount of urea vapor which can be condensed from the concentrated vapor mixture upon contact with the urea melt feedstock (which can be urea or a partially pyrolyzed mixture of urea and its autocondensation products of biuret, triuret and cyanuric acid) being fed to the urea pyrolysis reactor(s) is dependent upon the temperature and equilibrium vapor phase concentration of the urea melt feedstock, the mole fraction concentration of the urea phase in the concentrated vapor mixture and the temperature at which it is contacted with the urea melt, and the respective flow rates of the urea melt and concentrated vapor mixture being contacted.

In order to maintain the concentration of the urea vapor in the residual vapor mixture leaving the contactor at a minimum, thereby assuring a high rate of urea recovery, it is preferred that the concentrated vapor mixture leaving the condensor be contacted with a urea melt feedstock which is at or near its fusion point of from about 135° to about 140°C. At this temperature, the equilibrium vapor phase concentration of the urea melt is at a minimum level. Since the mole fraction concentration of the urea phase of the concentrated vapor mixture has been increased (by condensing and removing a substantial portion of the hydrocarbon vapor) to a level above the minimum vapor phase dictated by the urea melt, a substantial portion of the urea vapor will be condensed upon contact with the urea melt, provided the urea melt can effectively absorb the urea heat of condensation.

To insure sufficient absorption of the heat of condensation of the urea, the temperature of the concentrated vapor mixture is preferably maintained below the temperature of the urea melt, i.e., about 135°–140°C. and the rate of contact between the melt and vapor mixture is appropriately regulated so the heat of condensation of urea is effectively absorbed. Usually, the flow rate of the concentrated vapor mixture into the contactor is nearly in equilibrium with, or slightly below, the urea melt flow rate.

Since urea pyrolysis reactions are usually carried out at temperatures ranging from about 115° to about 350°C., many of the purged vapor mixtures emerging therefrom will have temperatures substantially higher than the preferred temperature of below about 135°–140°C. for contact with urea melt. Even though suitable inert condensable gases (at or near the reactor temperature) can be employed to purge the reactors in higher temperature reactions and which can subsequently be cooled and condensed without also condensing the urea vapor component, the concentrated vapor mixtures are at temperatures above 135°–140°C. At these higher vapor temperatures the urea melt, upon contact with the urea vapor, does not efficiently absorb the urea heat of condensation, and a substantial amount of the urea vapor escapes with the residual vapor mixture and is lost to the system.

In such higher temperature pyrolysis reactions, the concentrated vapor mixture obtained can be additionally cooled to a temperature below about 135°–140°C., i.e., the preferred temperature of the urea melt feedstock wherein the equilibrium vapor phase concentration is at or near a minimum, but above about 120°C. While such methods can be employed in the present invention, additional cooling requirements can be minimized, and thus overall efficiency increased, when urea pyrolysis reactions are maintained at temperatures from about 120° to about 140°C.

A better understanding of the invention will be obtained by reference to the accompanying flow-diagram drawing illustrating one preferred process of the present invention.

Referring to the accompanying drawing, the condensable vapors of an inert hydrocarbon compound as disclosed hereinbefore (from a source not shown) are passed at a controlled flow rate through a conventional urea pyrolysis reactor 1, or a series of such reactors, to purge both evolved ammonia and urea vapor therefrom. The purged vapor mixture, comprising hydrocarbon, ammonia, and urea, is passed into a conventional condensor 2 wherein it is cooled to a temperature low enough to condense a substantial portion of the hydrocarbon vapor in said mixture but high enough to preclude condensation of the urea vapor therein. The resulting vapor mixture, concentrated in relation to urea vapor and ammonia, is then passed from the condensor to a conventional gas/liquid contacting column 3 where the concentrated vapor mixture is contacted countercurrently with fresh urea melt and a substantial amount of the urea vapor component of the concentrated vapor mixture is condensed upon contact with the urea melt. The contacting column 3 is provided internally with conventional packing (not shown) or a plurality of conventional trays 5 to achieve intimate contact of the urea melt liquid and concentrated vapor mixture. The urea melt with ccondensed urea is then fed from the contactor 3 to the pyrolysis reactor 1 and the residual vapor mixture, representing essentially ammonia, with small quantities of inert purge compound and urea, is passed to a conventional ammonia recovery unit 4 where the residual inert purge is separated and recovered for reuse and the residual urea taken up by the ammonia recovery medium.

Preferably, the gas/liquid contacting column 3 is substantially vertically disposed above the urea pyrolysis reactor(s) 1 so that the fresh urea melt feedstock flows therethrough to the reactor(s) under the force of gravity.

SPECIFIC EXAMPLE

At the start of a urea pyrolysis reaction, a urea pyrolyzate melt having a temperature of about 135°C. was fed at a flow rate of about 67 lb/hr through a gas/liquid contacting column into a urea pyrolysis reactor. During the urea pyrolysis reaction, an inert condensable hydrocarbon gas, Isopar E (a commercially available isoparaffinic hydrocarbon fraction primarily consisting of branched-chain alkanes containing eight carbon atoms and having a normal boiling point of about 125°C.), was passed through the pyrolysis reactor at a flow rate of about 1,000 lb/hr to purge ammonia (at a rate of about 10.23 lb/hr) and urea vapor (at a rate of about 8.45 lb/hr) from the pyrolysis reactor. The vapor mixture of Isopar E/ammonia/urea emerging from the reactor at the above rates was fed into a condensor and cooled to a temperature of about 125°C. At this temperature, a majority of the inert Isopar E purge gas was rapidly condensed and removed from the condensor (at a rate of about 957 lb/hr) with substantially no condensation of the urea, and a concentrated vapor mixture having greatly increased mole fraction concentrations relative to ammonia and urea was obtained.

The concentrated vapor mixture of Isopar E/ammonia/urea was removed from the condensor at a temperature of about 125°C. and at rates representing about 43 lb/hr of Isopar E (approximately 4 percent of original purge volume), about 10.23 lb/hr of ammonia and about 8.45 lb/hr of urea, and contacted with the fresh urea melt entering the top of the gas/liquid contacting column at a temperature of about 135°C. by passing the urea melt and the concentrated vapor mixture countercurrently to each other through the contacting column.

The flow rate of urea melt from the gas/liquid contacting column to the pyrolysis reactor was measured and it was found that the urea melt flow rate had been increased from a rate of about 67 lb/hr to a rate of about 75.3 lb/hr. Thus, of the 8.45 lb/hr of urea vapor entering the gas/liquid contacting column, 8.3 lb/hr., or about 99.8 percent, had been condensed and recovered for further use in the pyrolysis reactor, while only about 0.2 percent of the urea vapor was carried off with the effluent vapor mixture.

The effluent vapor mixture was cycled to an ammonia recovery unit where the inert purge gas remaining and ammonia were separated and recovered at rates of 43 lb/hr. and 10.23 lb/hr., respectively; the remaining urea, at a rate of 0.14 lb/hr., or about 0.2 percent of the total amount of urea fed per hour, was lost to the ammonia recovery medium.

Solely by way of comparison, the process was repeated under the same reaction conditions and flow rates except that a gas purge of nitrogen, which cannot be condensed without also causing the urea vapor to condense, was employed in place of the hydrocarbon vapor purge. In this example, the purged vapor mixture was passed from the urea pyrolysis reactor, at the same rates as in Example 1, to a conventional separator unit wherein the nitrogen purge was separated from the ammonia at a rate of 1,000 lb/hr and recycled and the ammonia was recovered at a rate of 10.23 lb/hr. The urea vapor was taken up by the ammonia recovery medium at a rate of 8.45 lb/hr and lost to the system. At an original urea feed rate of 67 lb/hr, the removal of urea at a rate of about 8.45 lb/hr from the system represents a loss of about 12.6 percent of the total urea fed.

We claim:

1. An improved method for recovering and recycling unreacted vaporized urea from a purge vapor mixture containing urea and ammonia driven off from one or more urea pyrolysis reactors into which a melt feedstock of urea or a partially pyrolyzed mixture of urea and its autocondensation products is fed and pyrolyzed, said method comprising purging said urea pyrolysis reactors with the vapors of an inert compound, said vapors being condensable at temperatures above about 120°C., cooling the purged ammonia and urea containing vapor mixture in a condensor to a temperature above about 120°C. but below the temperature of the melt feedstock being fed to condense a substantial amount of the inert purge vapor, passing the resulting concentrated vapor mixture having greatly increased mole fraction concentrations relative to ammonia and urea to a gas/liquid contacting column, separating the urea vapor from the concentrated vapor mixture by contacting countercurrently in said column the concentrated vapor mixture with said melt feedstock having a temperature about its fusion point and an equilibrium vapor phase concentration at or about a minimum thereby condensing and recovering a substantial amount of the urea vapor contacted by said melt feedstock.

2. A method according to claim 1 wherein the condensable vapors of the inert compounds employed are the vapors of saturated branched- and straight- chain hydrocarbon compounds of the alkane series having from about eight to about 12 carbon atoms or mixtures thereof which are condensable at temperatures above about 120°C.

3. A method according to claim 1 comprising purging one or more urea pyrolysis reactors with a mixture of the condensable vapors of eight and nine carbon atom isoparaffinic hydrocarbons, cooling the purged hydrocarbon/ammonia/urea vapor mixture in the condensor to a temperature of about 125°C. to condense a substantial amount of the hydrocarbon vapor, passing the resulting concentrated vapor mixture having greatly increased mole fraction concentrations relative to ammonia and urea to a gas/liquid contacting column, separating the urea vapor from the concentrated vapor mixture by contacting countercurrently in said column the concentrated vapor mixture with melt feedstock having a temperature of from about 135° to about 140°C. and an equilibrium vapor phase concentration at or about a minimum thereby condensing and recovering a substantial amount of the urea vapor contacted by said melt feedstock.

4. A method as claimed in claim 1 wherein the gas/liquid contacting column is substantially vertically disposed above the urea pyrolysis reactor so that the melt feedstock flows therefrom to the reactor under the force of gravity.

* * * * *